May 23, 1939.  W. B. BOOM  2,159,247
BASE FOR MACHINE TOOLS AND THE LIKE
Filed April 2, 1936   2 Sheets-Sheet 1
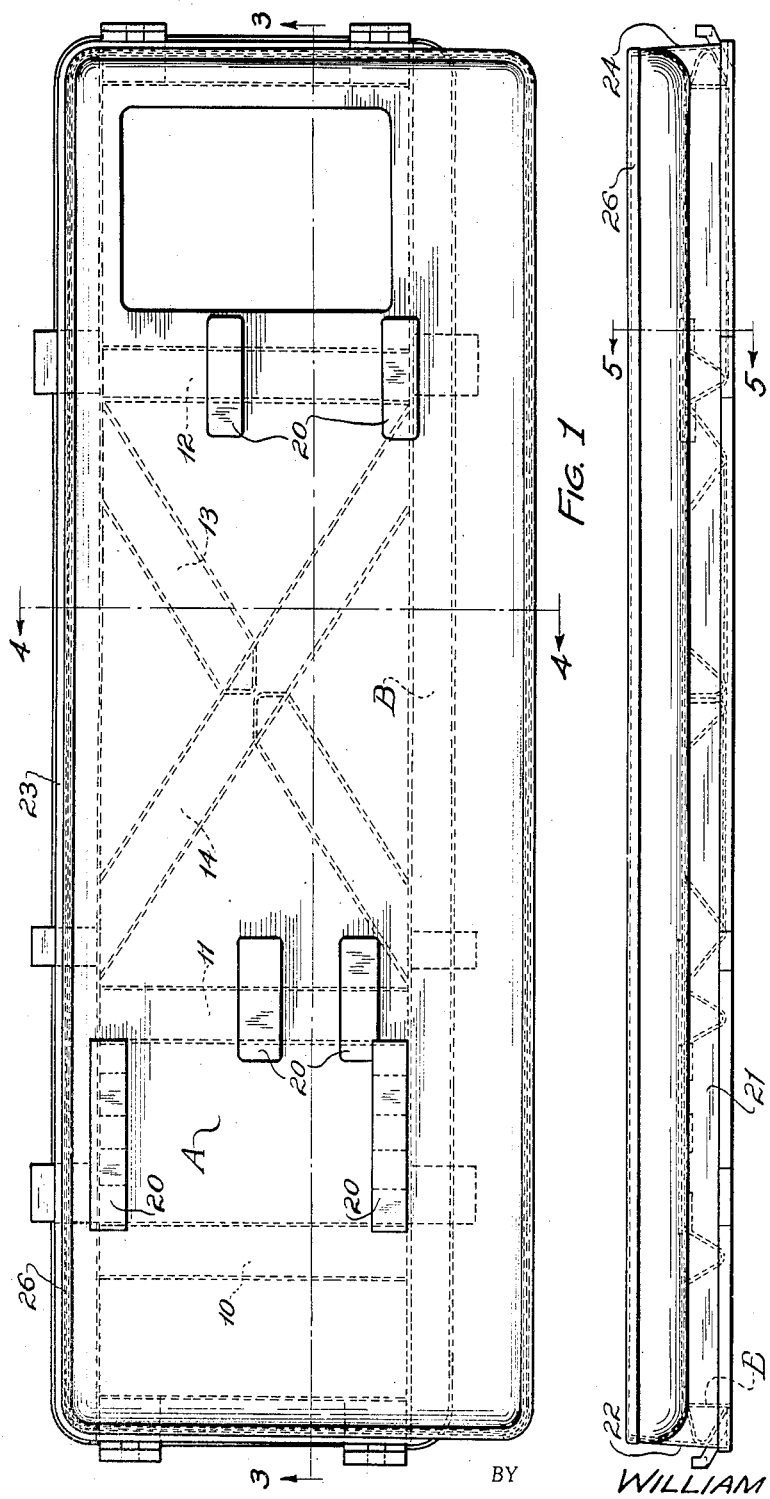
INVENTOR.
WILLIAM B. BOOM
BY Hurst, Hudson & Kent
ATTORNEYS.

May 23, 1939.  W. B. BOOM  2,159,247
BASE FOR MACHINE TOOLS AND THE LIKE
Filed April 2, 1936  2 Sheets-Sheet 2
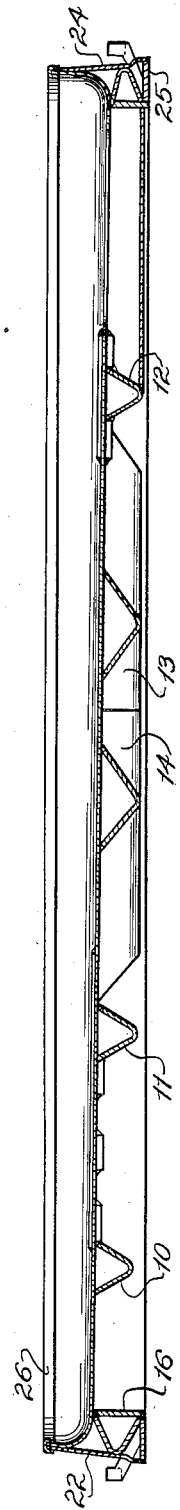
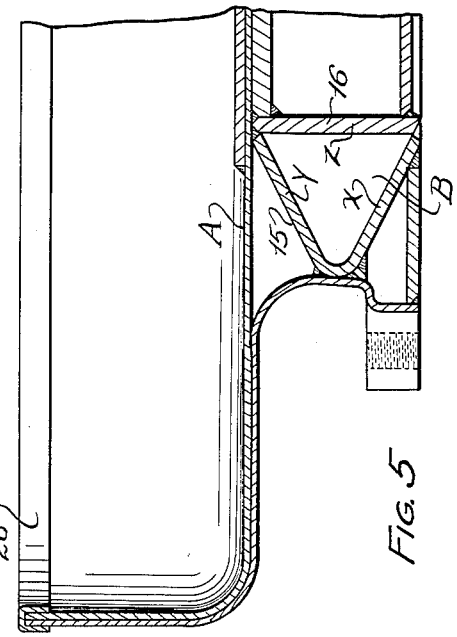
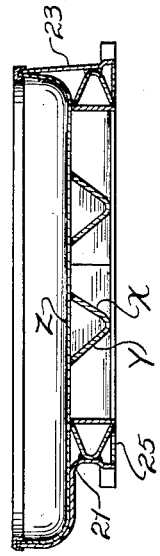
INVENTOR.
WILLIAM B. BOOM
BY Kwis, Hudson & Kent
ATTORNEYS.

Patented May 23, 1939

2,159,247

UNITED STATES PATENT OFFICE 2,159,247

BASE FOR MACHINE TOOLS AND THE LIKE

William B. Boom, Lakewood, Ohio

Application April 2, 1936, Serial No. 72,257

2 Claims. (Cl. 248—19)

The present invention relates to bases for machine tools and the like and more particularly to such bases fabricated from steel plates or sheets.

An object of the present invention is the provision of a novel base fabricated from steel plates, which will be light in weight, rigid in construction, economical to manufacture, and otherwise satisfactory for the purpose intended.

The present invention resides in certain combinations and arrangements of parts and further objects and advantages thereof will be apparent from the following description of the preferred embodiment thereof described with reference to the accompanying drawings forming a part of this specification, in which similar reference characters designate corresponding parts, and in which:

Fig. 1 is a plan of a base for a machine tool embodying the present invention;

Fig. 2 is a side elevation of the base shown in Fig. 1;

Fig. 3 is a section on the line 3—3 of Fig. 1;

Fig. 4 is a section on the line 4—4 of Fig. 1; and

Fig. 5 is an enlarged section on the line 5—5 of Fig. 1.

Heretofore in the art numerous attempts have been made to make a fabricated base for machine tools, motor generator sets, and the like, but prior to the present invention these attempts have never proven entirely successful. Such a base must be rigid in construction and capable of maintaining its alignment despite rough treatment. It must be light in weight, the lighter the better, since lightness is the principal advantage thereof, aside from the fact that a fabricated base will not break, and the cost thereof should not exceed that of an equivalent cast or forged base.

The base of the present invention, generally speaking, comprises an upper supporting plate or surface A resting upon and welded to or forming a part of a continuous frame B of tubular or hollow equilateral triangular cross-section, preferably having the base of the triangle positioned normal to the plane of the surface A and the apex thereof projecting outwardly. The plate or surface A may be reinforced inside of the rectangular frame B by V-shaped cross members 10, 11, 12, 13 and 14, the latter two of which intersect and are mortised together, having the upper flanges or edges thereof welded to the underside of the plate A forming therewith a tubular equilateral triangular section in which the base of the triangle is parallel to the plane of the plate or supporting surface.

The sides of the rectangular frame B, as previously stated, are of tubular triangular cross-section, and the two sides X and Y thereof other than the base Z, are formed of a metal plate 15 bent lengthwise about a radius substantially one and one-half to two times the thickness of material until the angle included therebetween is substantially 60°. The base Z of the tubular triangular cross-section may comprise either a separate strip 16, see Fig. 5, welded to the free edges of the member 15, or a part of some other member of the base. It will be observed, that, in the case of the cross-members 10 to 14 inclusive, the plate A or portions thereof, form the base of the tubular triangular cross-section. This illustrates the alternative construction referred to above, wherein the base of the triangle is a part of some other member of the base.

The particular base illustrated is especially adapted for a machine tool, and has a plurality of pads 20 welded to the upper side of the plate A to which the legs of the machine are adapted to be attached. The sides of the plate A are bent up and welded together to form a chip and oil pan. In order to give the base a more finished appearance and to stiffen the parts thereof outside of the rectangular frame B, the sides are enclosed by side plates 21, 22, 23 and 24, the lower edges of which are welded to the outside edges of spacer members 25 welded to a lower outside part of the frame B, while the upper edges thereof are shaped to conform with the plate A. The upwardly extending edges of the plate A and the side plates are connected together by an inverted channel-shaped member 26 which is welded in position thereover. The side plates are also welded to the apex of the side members of the frame A to further reinforce the whole.

From the foregoing description of the preferred embodiment of the invention it will be apparent that I have provided a fabricated steel base for machine tools and the like, which is light in weight, inexpensive to manufacture, rugged in construction, free from deflection, and capable of maintaining its alignment despite rough treatment. The closed member of tubular equilateral triangular cross-section braces the area enclosed thereby in a manner which prevents deflection thereof, and which is far superior to that obtained by any other section.

The preferred embodiment of the invention has been illustrated and described in some detail, but I do not wish to be limited to the particular construction shown which may be varied considerably within the scope of the present invention. It is my intention to cover all adaptations, modifications, and uses of the invention that come within the practice of those skilled in the art to which it relates, and I particularly point out and claim the following:

1. A base for machine tools or the like formed of welded-up steel plates and having a supporting portion adapted to receive a device to be supported thereon, and stiffening means for said supporting portion comprising longitudinally and transversely extending V-shaped members welded to the supporting portion, the construction being such that a transverse section normal to the supporting surface through either said longitudinally or said transversely extending members has a portion thereof of tubular triangular cross section.

2. A base for machine tools and the like formed of welded-up steel plates having a supporting portion adapted to receive a device to be supported thereon, and stiffening means for the supporting portion comprising V-shaped reenforcing members welded to the supporting portion adjacent the edges thereof the construction being such that a transverse section normal to the supporting surface through the reenforcing members has a portion thereof of tubular isosceles triangular cross section.

WILLIAM B. BOOM.